United States Patent Office 2,985,813
Patented May 23, 1961

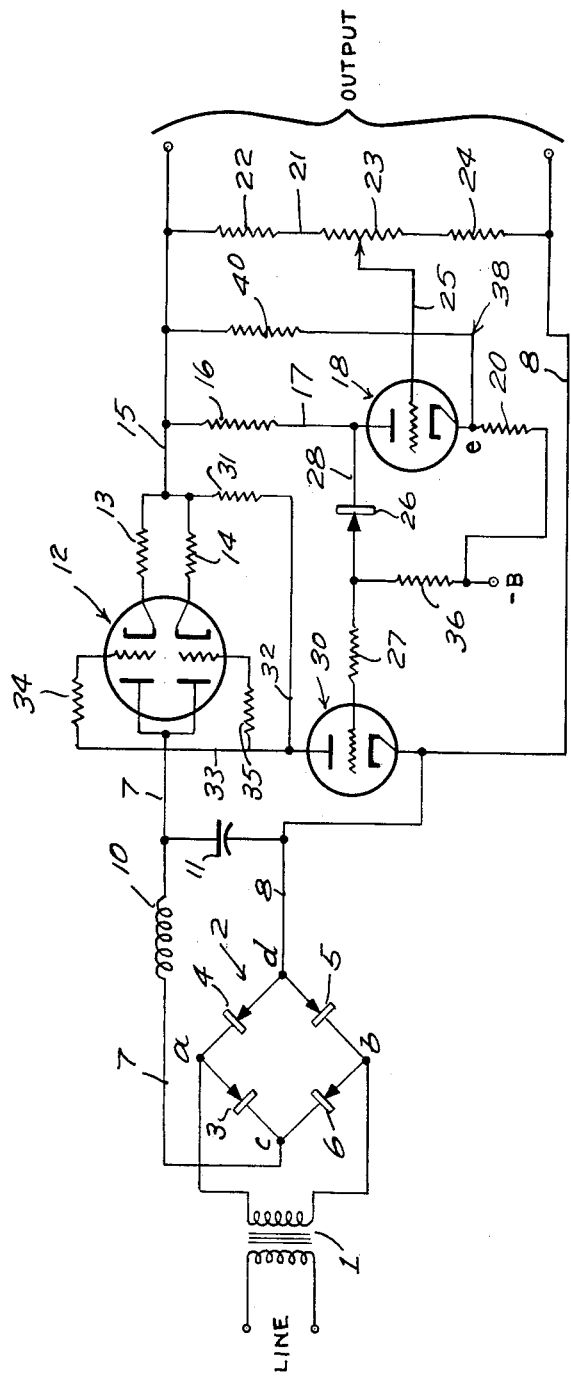

2,985,813

REGULATED POWER SUPPLY AGAINST LOAD, NOT LINE

Alan R. Garfinkel, Forest Hills, N.Y., assignor to Sperry Rand Corporation, Ford Instrument Company Division, Wilmington, Del., a corporation of Delaware Filed Dec. 9, 1958, Ser. No. 779,244

7 Claims. (Cl. 321—18)

This invention relates to voltage regulator circuits and particularly to circuits having load voltage regulation and employing more than a single source of supply.

The usual series circuit which is adapted to regulate its output against load voltage variations employ the same line voltage to bias other nonregulated voltage supplies in the circuit and the problem has been encountered of maintaining the desired voltage ratios between the supply and biasing voltages on these voltage supplies notwithstanding changes in line voltage. Although these circuits may provide voltage regulations against load voltage variation, the voltage supplied the sources may change with respect to their bias voltage while the regulation is being effected.

According to this invention, there is provided a unique circuit expedient in conjunction with a basic type of series regulator circuit which preserves the desired bias voltage ratios on all the supplies during voltage regulation. In general, this expedient includes a voltage divider referenced to a supply which is dependent upon the line voltage, and which in turn supplies the bias voltage to a voltage regulator in such a manner that the bias voltage will reflect any change in the line voltage supplied the regulator. The resulting control of the supply-bias voltage ratio is achieved without hindering the ability of the circuit to regulate against load voltage variation.

The invention will be better understood on reading the following detailed description of one of its embodiments which is taken in conjunction with the accompanying drawing showing a schematic of a load voltage regulated circuit.

Referring to the drawing, a standard series regulator is supplied by a line across which is placed the primary of voltage transformer 1 which is the principal source of voltage supply. The secondary winding of the transformer is connected to the input points a and b of full wave rectifier 2 composed of half wave rectifiers 3, 4, 5 and 6. Terminals c and d of the rectifier are connected to the output side of the regulator by means of leads 7 and 8.

The output of the rectifier 2 is smoothed by means of a filter which includes an inductor 10 disposed in the lead 7 and a capacitor 11 placed across the leads 7 and 8. The filter serves to give a fairly steady output under load conditions.

The lead 7 is connected to the two plates of duo-triode series regulator tube 12 the cathode electrodes of which are connected through cathode resistors 13 and 14, to lead 15 which serves as one output. The regulator consists of plate resistor 16 in lead 17 on which the output voltage is impressed by virtue of the connection of output lead 15 to lead 17. Grid tube 18 is also provided in the lead 17 as an amplifier in the regulator circuit. The cathode resistor 20 for the tube 18 is supplied by a —B source of voltage which is an unregulated voltage reflecting changes in the line voltage.

The grid control for the tube 18 is established by a bleeder circuit 21 connected across the output leads 15 and 8 of the series regulated circuit and composed of series resistors 22, 23 and 24. The resistor 23 which is responsive to output voltage changes, is connected to the grid of the tube 18 by variable contact lead 25. The plate lead 17 is connected through grid voltage dropping zener diode 26 and grid resistor 27 in lead 28 to the grid of a second grid tube 30, the plate of which is supplied by plate resistor 31 in supply lead 32 connected from the supply output lead 15. The output lead 33 of the grid tube 30 furnishes the control for the duo-triode tube 12 and to this end is connected to its two grids through grid resistors 34 and 35.

The second supply source —B is connected to the plate-grid lead 28 through resistor 36 and serves thereby to provide grid bias for the grid tube 30. This supply source is also employed to reference voltage divider circuit 38 which includes the series voltage dividing resistors 20 and 40, the resistor 40 being connected to the output lead 15. The voltage dividing circuit is connected to the cathode of the grid tube 18 at point e in the circuit which is located between its series resistors.

It is thus seen that if the line voltage changes, the —B supply voltage to the cathode of tube 18 changes. This change is reflected at the output of the regulated supply. If the load at the output changes, the —B supply voltage remains constant and the circuit acts similar to the operation of a normal regulator. The change in load is sensed at the grid of tube 18. Since point e tends to remain constant the change in output voltage is amplified, inverted and used to control the voltage drop across tube 12 by varying the bias of the grids of tube 12.

Various modifications may be made in the circuit as described and illustrated herein without departing from the scope and principle of invention as defined in the appended claims.

What is claimed is:

1. In a series voltage regulator circuit having a variable voltage supply source and a pair of circuit output leads, a voltage regulator means interposed in and connected across said circuit output leads, a full wave rectifier having a pair of input leads and a pair of output leads interposed in said circuit between said voltage supply source and said voltage regulator means with said input leads connected to said voltage supply source and said output leads connected to said circuit output leads, said voltage regulator means comprising a duo-triode control tube having the plates thereof connected together and to one of said rectifier output leads and the cathodes thereof connected together and to one of said circuit output leads, a triode control tube for said regulator duo-triode tube, a triode amplifier tube for said circuit, conductor means by which the grids of said duo-triode regulator tube are connected together and to the plate of said control triode tube, a conductor means by which the cathode of said control triode tube is connected to the other of said circuit output leads, a conductor by which the plate of said triode control tube is connected to the said one of said circuit output leads, a conductor by which the said one of said circuit output leads is connected to the plate of said amplifier triode tube, a conductor by which the grid of said control diode tube is connected to the said one of said circuit output leads and to the plate of said amplifier triode tube, a conductor by which the cathode of said amplifier tube is connected to the conductor by which the grid of said control triode tube is connected to the plate of said amplifier tube and to the said one of said circuit output leads, said last mentioned conductor including a voltage divider disposed between said one of said circuit output leads and the cathode of the amplifier tube, a negative supply source independent of said variable voltage supply source and connected to said last mentioned conductor to provide grid bias for said control triode tube and a reference voltage for said voltage divider, a bleeder circuit connected across the said circuit output leads, a pair of series resistors interposed in said bleeder circuit, a resistor which is responsive to output voltage changes interposed in said bleeder circuit intermediate said pair of series resistors, and a variable contact by which the grid of said amplifier triode tube is connected to the said resistor which is responsive to output voltage changes.

2. A voltage regulator means for a series voltage regulator circuit as defined by claim 1 in which each of the grids of said duo-triode regulator tube is connected to the plate of said triode control tube through a grid resistor and in which each of the cathodes of said duo-triode regulator tube is connected to the said one of said circuit output leads through a cathode resistor.

3. A voltage regulator means for a series voltage regulator circuit as defined by claim 1, in which a plate resistor is interposed in the conductor by which the plate of said triode amplifier tube is connected to the said one of said circuit output leads.

4. A voltage regulator means for a series voltage regulator circuit as defined by claim 1, in which a plate resistor is interposed in the conductor by which the plate of said triode control tube is connected to the said one of said circuit output leads.

5. A voltage regulator means for a series voltage regulator circuit as defined by claim 2 in which a plate resistor is interposed in the conductor by which the plate of said triode amplifier tube is connected to the said one of said circuit output leads.

6. A voltage regulator means for a series voltage regulator circuit as defined by claim 1 in which a grid resistor and a voltage dropping zener diode are interposed in series in the conductor by which the grid of said triode control tube is connected to the plate of said triode amplifier tube and to the said one of said circuit output leads.

7. A voltage regulator means for a series voltage regulator circuit as defined by claim 6 in which the conductor by which the cathode of said triode amplifier tube is connected to the conductor by which the grid of said triode control tube is connected to the plate of said amplifier triode tube has a pair of resistors interposed in series therein and is connected to the said conductor intermediate the grid resistor and the voltage dropping zener diode interposed therein.

References Cited in the file of this patent
UNITED STATES PATENTS

| | | |
|---|---|---|
| 2,456,638 | Kenyon | Dec. 21, 1948 |
| 2,519,377 | Jenkins | Aug. 22, 1950 |
| 2,632,143 | Goodwin | Mar. 17, 1953 |
| 2,701,858 | Bakeman et al. | Feb. 8, 1955 |
| 2,717,353 | Sewell et al. | Sept. 6, 1955 |
| 2,881,381 | Haus et al. | Apr. 7, 1959 |